July 9, 1940.　　　　　A. G. OGDEN　　　　　2,207,266
PHOTOGRAPHIC JUSTIFYING MACHINE
Filed April 28, 1938　　　8 Sheets-Sheet 3

INVENTOR.
ASHLEY G. OGDEN
BY WM. S. Pritchard
ATTORNEY.

July 9, 1940.  A. G. OGDEN  2,207,266

PHOTOGRAPHIC JUSTIFYING MACHINE

Filed April 28, 1938   8 Sheets-Sheet 4

INVENTOR.
ASHLEY G. OGDEN
BY Wm. S. Pritchard
ATTORNEY.

July 9, 1940.  A. G. OGDEN  2,207,266
PHOTOGRAPHIC JUSTIFYING MACHINE
Filed April 28, 1938  8 Sheets-Sheet 5
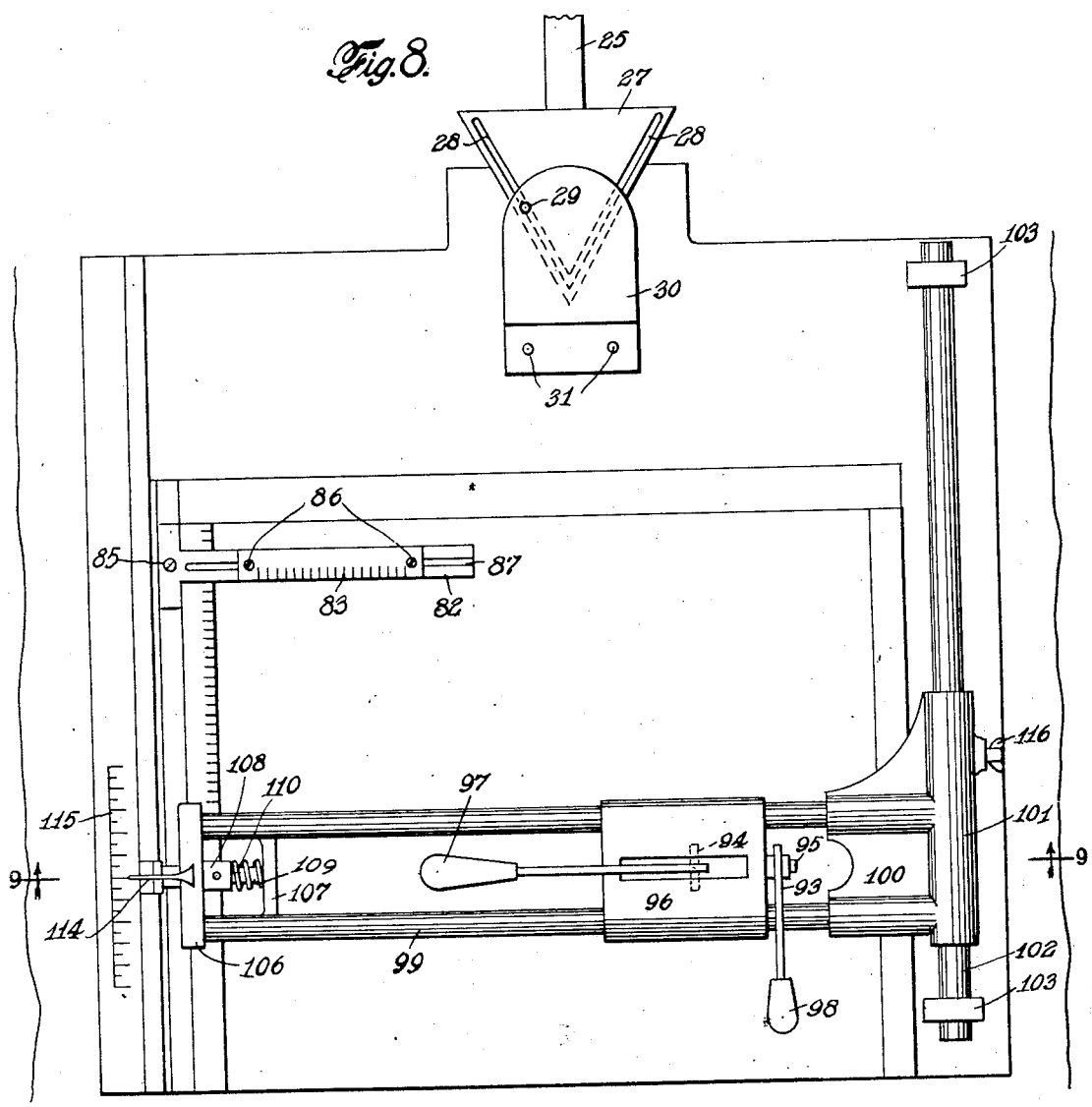
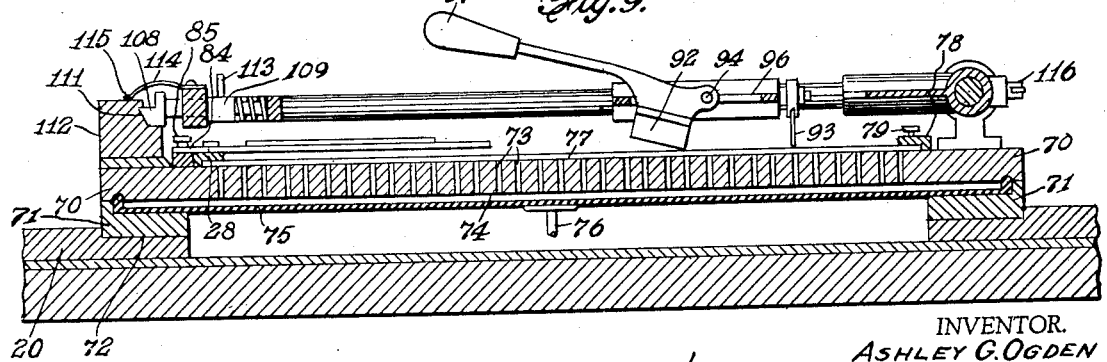
INVENTOR.
ASHLEY G. OGDEN
BY Wm. S. Pritchard
ATTORNEY.

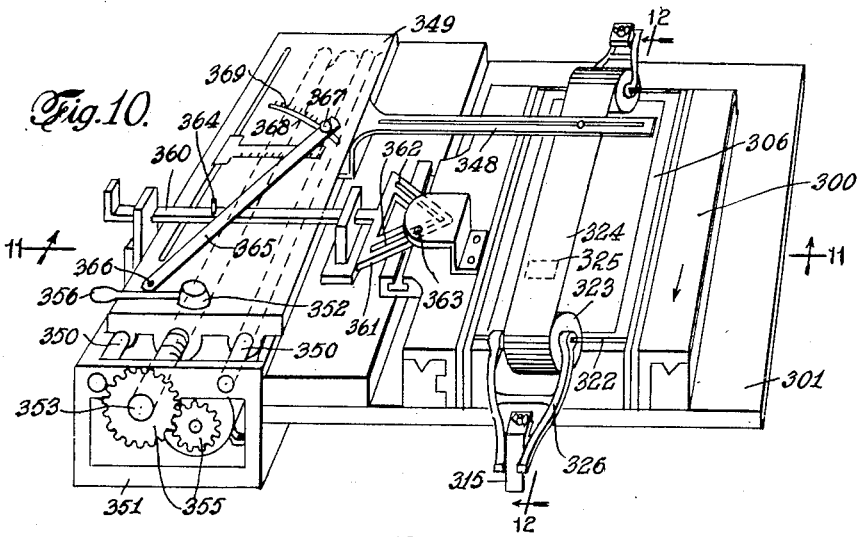
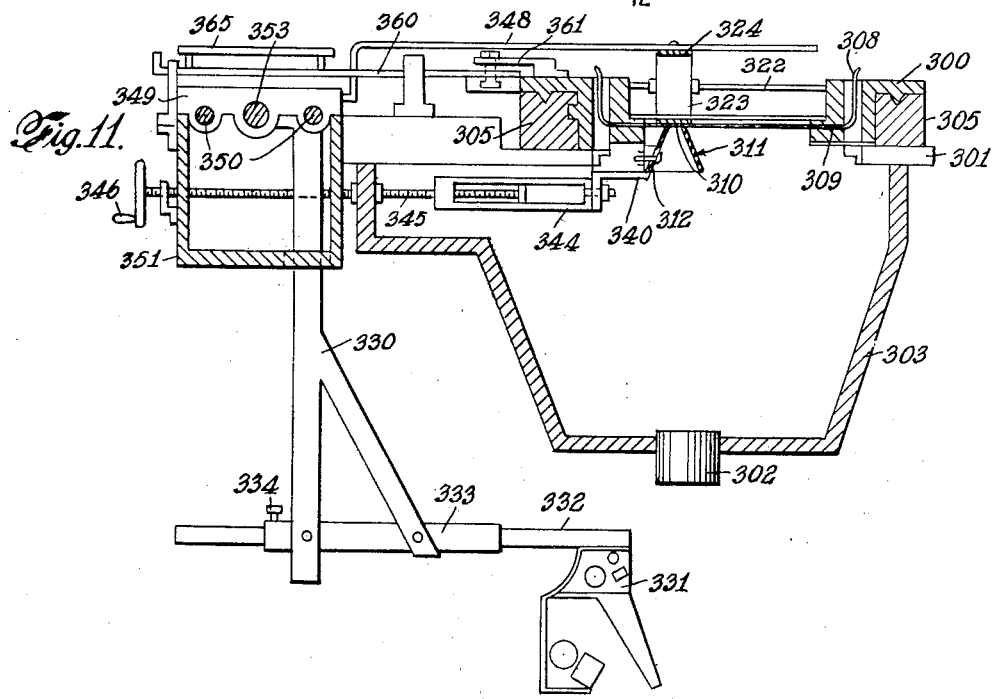
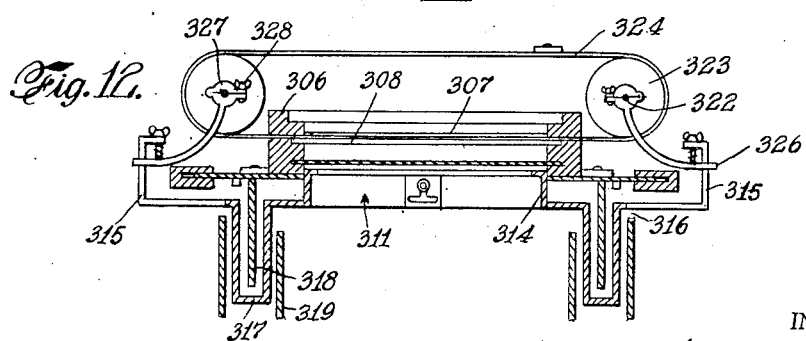

July 9, 1940.   A. G. OGDEN   2,207,266
PHOTOGRAPHIC JUSTIFYING MACHINE
Filed April 28, 1938   8 Sheets-Sheet 7
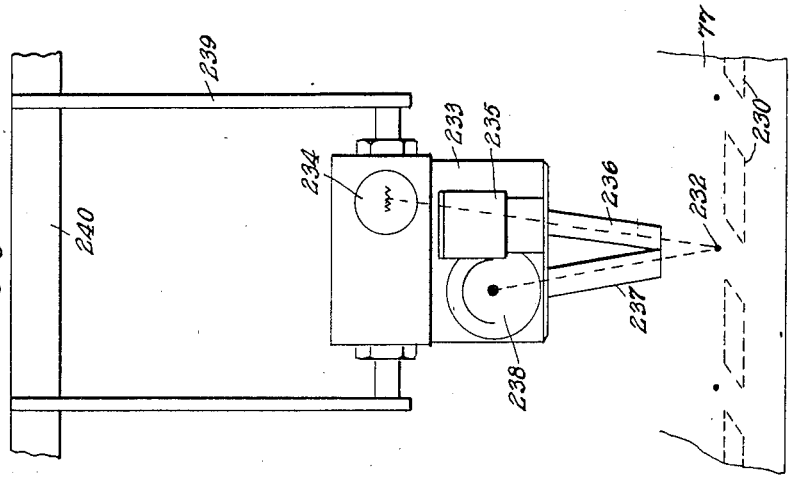
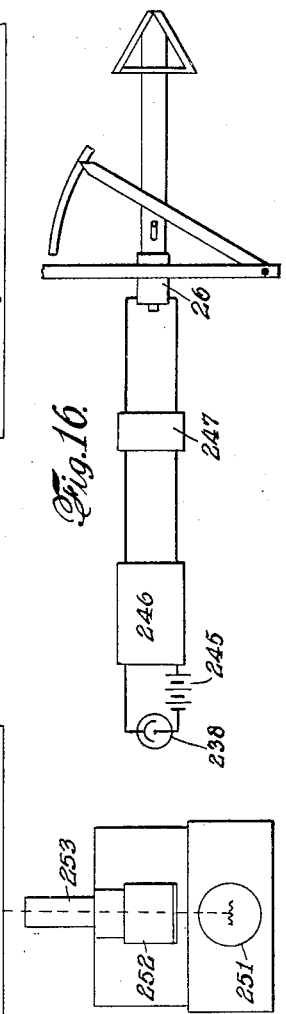
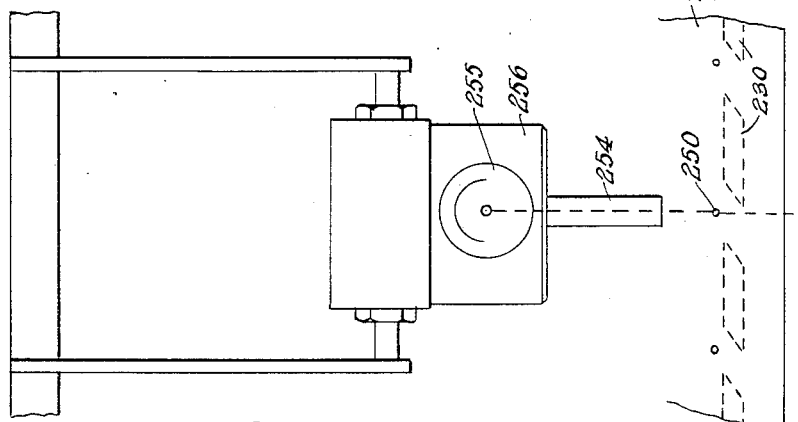
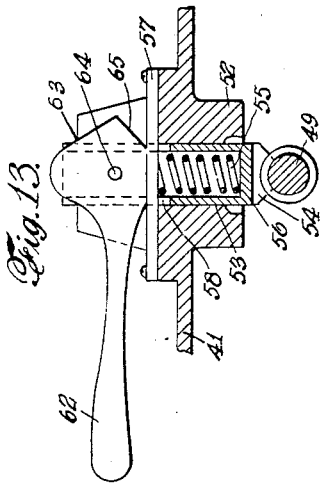
INVENTOR
ASHLEY G. OGDEN
BY Wm. S. Pritchard
ATTORNEY

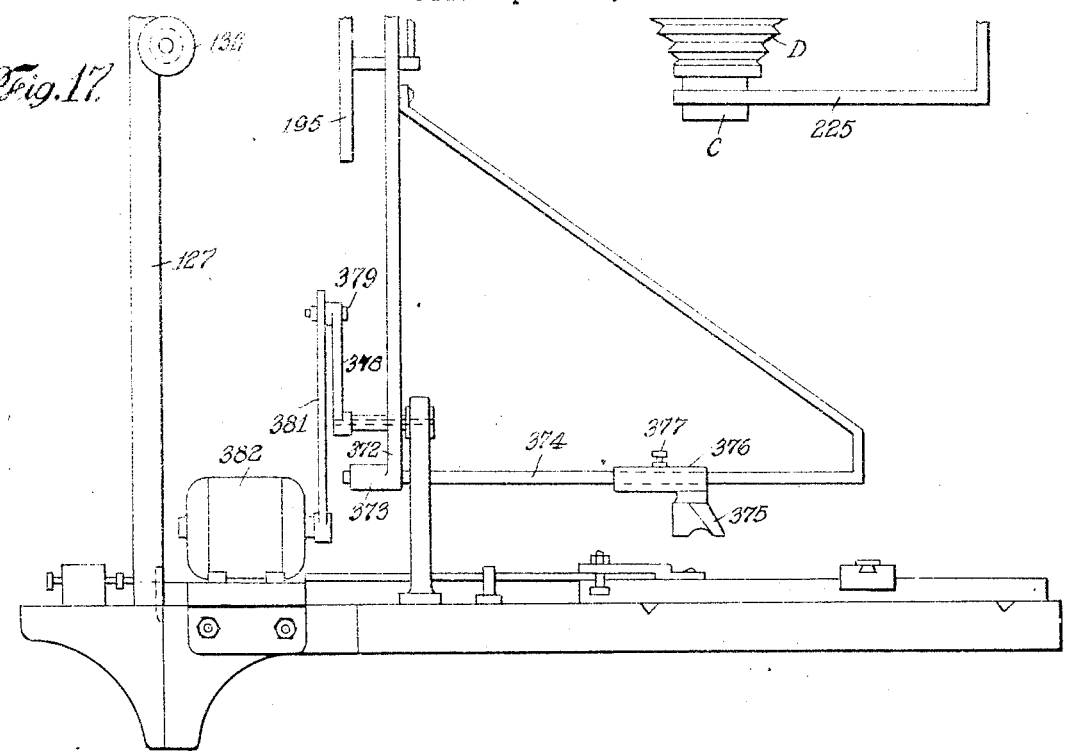
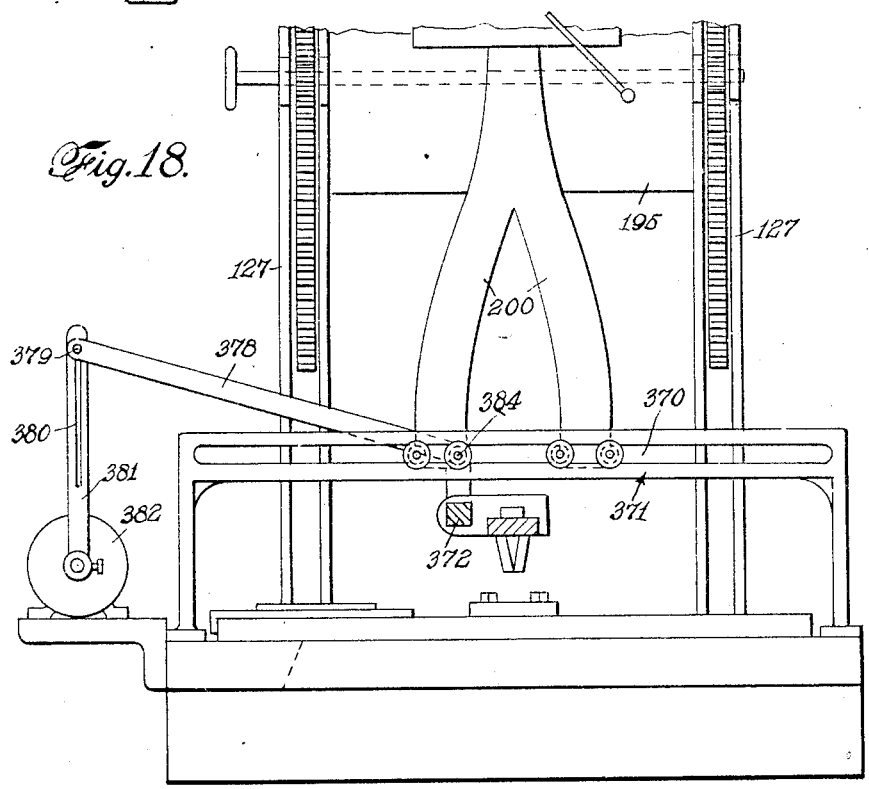

Patented July 9, 1940

2,207,266

UNITED STATES PATENT OFFICE 2,207,266

PHOTOGRAPHIC JUSTIFYING MACHINE

Ashley G. Ogden, Baltimore, Md.

Application April 28, 1938, Serial No. 204,732

43 Claims. (Cl. 95—4.5)

This invention relates to a machine for automatically and photographically reproducing in justified form an unjustified copy of the type made on a typewriting machine or a phototype-composing machine.

An object of the invention is to provide a machine of the above type for automatically effecting the justification and distributing the line correction in a plurality of divisions, such as at the spaces between words.

Another object is to provide a machine of the above type for automatically correcting the spacing between words in a line so as to produce a line of predetermined length.

Another object is to provide, in a machine of the above type, for maintaining equal spacings between the various words of a line.

A further object is to provide a novel and improved machine of the above type which photographically scans the successive lines of the copy and automatically adjusts the spacing between words in each line so as to effect the desired justification.

A further object is to provide simple and improved means for making the necessary adjustments in such a machine.

A still further object is to provide a machine of the above type which is capable of rapidly and efficiently producing justified copies with a minimum of manual attention.

Various other objects and advantages will be apparent as the nature of the invention is more fully disclosed.

Although the novel features which are believed to be characteristic of this invention will be pointed out more particularly in the claims appended hereto, the invention itself may be better understood by referring to the following description, taken in connection with the accompanying drawings, in which a particular embodiment thereof has been set forth for purposes of illustration.

In the drawings:

Figure 8 is an enlarged detail view of the copy-holder;

Figure 9 is a section taken on the line 9—9 of Figure 8;

Figure 10 is a perspective view of a plate-holder and control mechanism illustrating another embodiment of the invention;

Figure 11 is a section taken on the line 11—11 of Figure 10;

Figure 12 is a section taken on the line 12—12 of Figure 10;

Figure 13 is a detail view of the carriage-release mechanism;

Figure 14 is a detail view of the photo-electric control mechanism;

Figure 15 is a detail view of another form of photo-electric control mechanism;

Figure 16 is a circuit diagram illustrating the operation of the photo-electric mechanism;

Figure 17 is a side elevation of a portion of the feed carriage illustrating a modified type of drive therefor; and Figure 18 is a front elevation of the mechanism shown in Figure 17.

In the following description and in the claims certain specific terms are used for convenience in referring to the various details of the invention. It is to be understood, however, that these terms are to be given as broad an interpretation as the state of the art will permit.

Figure 1:
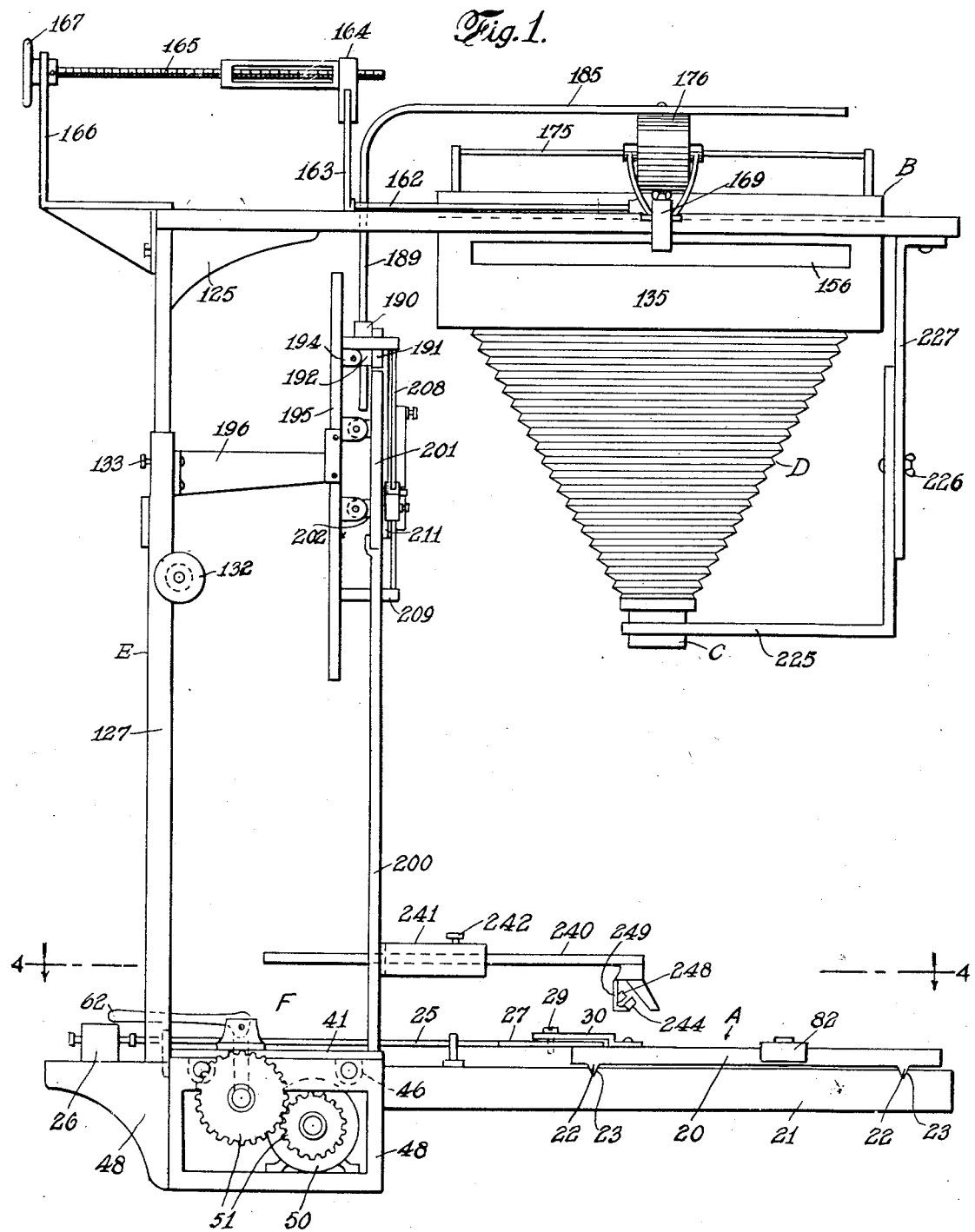
Figure 1 is a side elevation of a photographic justifying machine illustrating one embodiment of the present invention.

Referring to the drawings more in detail, the machine is shown in Figure 1 as comprising a copy-holder A which is adapted to receive and support the unjustified copy, and a camera comprising a plate-holder B containing the sensitized plate on which the copy is to be photographed in justified form and an optical system including a lens-holder C and camera bellows D, all mounted on a suitable supporting framework E and controlled by a feed mechanism F, as described more in detail below.

Copy-holder

The copy-holder A is shown in Figures 1, 4, 8 and 9 as comprising a frame 20 slidably mounted on a base 21 by means of a pair of rails 22 (Figure 1) sliding in grooves 23 formed in the top surface of said base and arranged to permit longitudinal adjustment of the copy-holder, that is, adjustment in a direction parallel to the lines to be justified.

For effecting this longitudinal adjustment of the frame 20, there is provided a control rod 25 (Figure 4) which is actuated by a solenoid 26 and carries a triangular-shaped head 27 provided with a pair of oppositely inclined grooves 28.

A pin 29 may be threaded in a bracket 30 which is attached to the frame 20, as by screws 31, and extends into a selected groove 28 of the head 27, the selected groove depending upon the desired direction of movement of the frame, as will be described.

It will be noted that movement of the rod 25 causes the groove 28 of the head 27 to shift the pin 29 and the frame 20 in a longitudinal direction with respect to the lines of the copy. For limiting this movement, a pin 38 is carried by the rod 25 in a position to engage a bar 39 which is pivotally mounted as at 40 to a carriage plate 41 and at its free end carries a set screw 42 engaging an arcuate slot 44 in said carriage plate to permit the angular position of said bar 39 to be adjusted as desired. A scale 43 may be provided to facilitate adjustment of the bar 39.

The carriage plate 41 is mounted for longitudinal movement on guide rods 45 by means of ears 46 which project from the underside of said carriage plate, as shown in Figure 1. The guide rods 45 are held in a frame 48 carrying a threaded shaft 49 and a driving motor 50 which actuates the same through gears 51.

The carriage plate is provided with a boss 52, shown in detail in Figure 13, in which a tubular member 53 is slidably mounted. This tubular member 53 carries a half nut 54 on its lower end which is held in threaded engagement with the threaded shaft 49 by means of a spring 55 which is seated within said tubular member 53 between the bottom 56 thereof and a bar 57 which is attached to the top of the boss 52 and extends through slots 58 in said tubular member.

A control handle 62, carrying a cam head 63, is pinned to the tubular member 53 by a pin 64. The cam head 63 is provided with a cam surface 65 which is adapted, when the handle 62 is raised, to bear against the bar 57 and raise the tubular member 53 against the force of the spring 55 so as to release the half nut 54 from the threaded shaft 49. By this mechanism, the carriage plate may be readily engaged with the threaded shaft 49 to be driven longitudinally thereby, or may be released for manual return or adjustment.

A copy support 70, shown more in detail in Figures 8 and 9, is provided with rails 71 which are slidably mounted on shoulders 72 formed in the frame 20 to permit transverse adjustment thereof. The copy support is provided with a plurality of transverse apertures 73 communicating with a vacuum chamber 74 formed on the lower side of the copy support by a bottom plate 75 which may, if desired, comprise a rubber blanket. A tube 76 communicates with this vacuum chamber 74 and leads to a suitable source of vacuum (not shown). The purpose of the apertures 73 is to permit suction to be applied to the top surface of the copy support so as to secure a copy 77 thereon without the necessity of using adhesives, clamps or other securing means. This permits the copy to be cut or rearranged in the manner to be described and provides means for readily securing the various parts thereof in any selected position. The edges of the copy 77 may be secured by flanges 78 which are mounted on the copy support 70 and may be provided, if desired, with clamping screws 79.

A gage 82 (Figures 4, 8 and 9), carrying an adjustable scale 83, may be mounted as by means of a block 84 (Figure 9) for adjustable transverse movement on the copy support 70. A set screw 85 may be provided for holding the gage 82 in any selected position. The scale 83 may be slidably mounted on the gage 82 by pins 86 seated in a slot 87 in said gage. The scale 83 may be graduated, for example, from the center in both directions, and is adapted to designate the number of units by which each line is long or short of the predetermined justified length. The scale 83 is adapted to be set in accordance with the desired length of line, and the gage may be then manually shifted transversely to cause the scale to successively register with the different lines of the copy so as to measure the amount of justification required for each line.

A scale 88 may be mounted to indicate the position of the gage 82. In the embodiment shown, this scale 88 is formed or attached to the adjacent flange 78.

In certain instances where only a minor justification is required, this may be conveniently accomplished by cutting around one or more of the words, for example, the last word in the line, and shifting the same in accordance with the required justified length of the line. In other instances, it may be desired to cut between lines or words for correcting or altering the spacing or arrangement of the copy. For this purpose a set of cutting knives is provided, as shown in detail in Figures 8 and 9. These knives may comprise a longitudinal knife 92 and a transverse knife 93 mounted by pins 94 and 95 respectively on a slide 96 and provided respectively with handles 97 and 98. The slide 96 is mounted for longitudinal sliding movement on rods 99. These rods are shown as carried at one end in a bracket 100 having a transverse boss 101 which is slidably mounted on a transverse rod 102. This rod 102 may be mounted by brackets 103 on the copy support 70.

The rods 99, on their free ends, are provided with a header 106 and a transverse brace 107. A catch member 108 is mounted on a rod 109 which is slidable in the header 106 and is held by a spring 110 in an extended position so that the catch member 108 engages in a groove 111 in a block 112 attached to the copy support 70. A pin 113 is mounted on the rod 109 to provide a manual control for releasing the catch member 108 when desired. The transverse position of the knives is indicated by a pointer 114 carried by the header 106 and registering with a scale 115 on the block 112. The arrangement is such that when the catch member 108 is released, the rods 99 and the knives carried thereby may be pivotally turned about the rod 102 so as to expose and release the copy 77. A set screw 116 may be carried by the boss 101, so as to clamp the same in position on the rod 102 when desired.

In this embodiment, the rods 99 may be shifted transversely until the knife 92 is in a position between the lines which it is desired to separate. The slide 96 is then moved on the rods 99 to shift the knife 92 longitudinally of the line, so as to effect the necessary cutting operation. For cutting between words, the slide 96 is held stationary on the rods 99 and the bracket 100 is shifted on the rod 102 to properly position the knife 93 and to provide the necessary cutting movement. By this means, any word or group of words may be quickly cut from the copy, after which the portion of the copy containing the same may be shifted as desired, and will be automatically held in shifted position by the suction means above described.

*Plate-holder*

The plate-holder B (Figures 1 and 2) is mounted on a bracket 125 provided with vertical arms 126 which are slidably mounted on stationary supports 127 carried by the frame 48. Suitable adjusting means may be provided for adjusting the height of the bracket 125. In the embodiment shown, this comprises racks 128 carried by the arms 126 and engaged by pinions 129, mounted on a shaft 130 carried in ears 131 formed on the stationary supports 127 and provided with an adjusting handle 132. Set screws 133 may be provided for clamping the arms 126 in any adjusted position.

The plate-holder, as shown in Figures 1, 2, 3 and 5, comprises a frame 135 carried by the bracket 125 and on which is removably mounted a frame 136 having a light-proof top 137 and carrying a sensitized plate 138 on which the copy is to be photographed. A slidable shield 139 is positioned below the plate 138 and is provided with a substantially rectangular, longitudinal aperture 140 adapted to register with a selected portion of the plate 138 corresponding, for example, to a single line which is to be photographed thereon. This shield 139 is slidably mounted in the removable frame 136 and is adapted to pass upwardly through slots 141 in said frame as the shield is shifted. The ends of the shield may be rolled, as at 142, or may be otherwise disposed in such position as not to interfere with the remainder of the apparatus.

Figure 5:
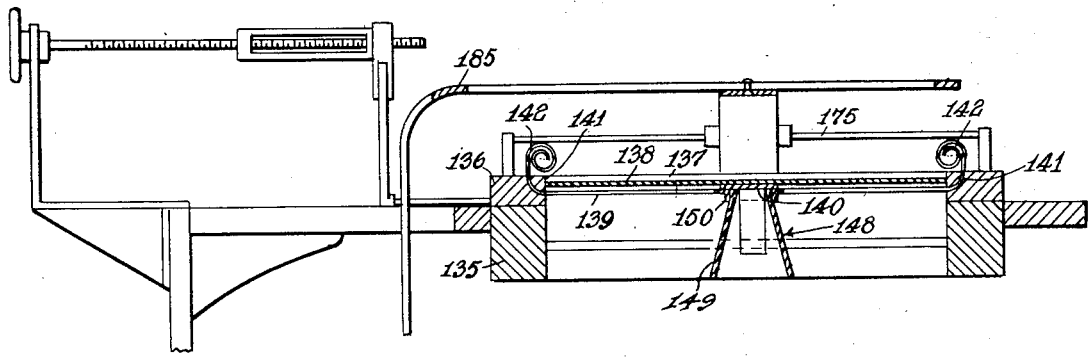
Figure 5 is a section taken on the line 5—5 of Figure 3.

A box 148 is provided, having sides 149 which are outwardly inclined in accordance with the cone of light received from the copy. This box 148 is adapted to fit within a flange 150 which is carried by the shield 139 and extends around the aperture 140 therein. The box 148, when in position as shown in Figure 5, is adapted to direct the light rays to the aperture 140 and to provide mechanical means for effecting the necessary transverse movement of the shield 139.

The box 148 may be provided with ends 152 (Figure 2) which are attached to brackets 153, each bracket having a downwardly bent portion 154 forming a channel to provide a light seal and having an arm 155 which extends outwardly through a slot 156 in the frame 135. A light baffle 157 may be attached to the frame 135 and extends downwardly past the slot 156 and within the downwardly bent portion 154 of each bracket 153. A second baffle 158 may be mounted on the frame 135 to extend upwardly on the inside of each bracket 153. The brackets 153 support the box 148 and extend outwardly through the slots 156 in the frame 135 to provide means for effecting the desired transverse movement of the shield 139.

Figure 3:
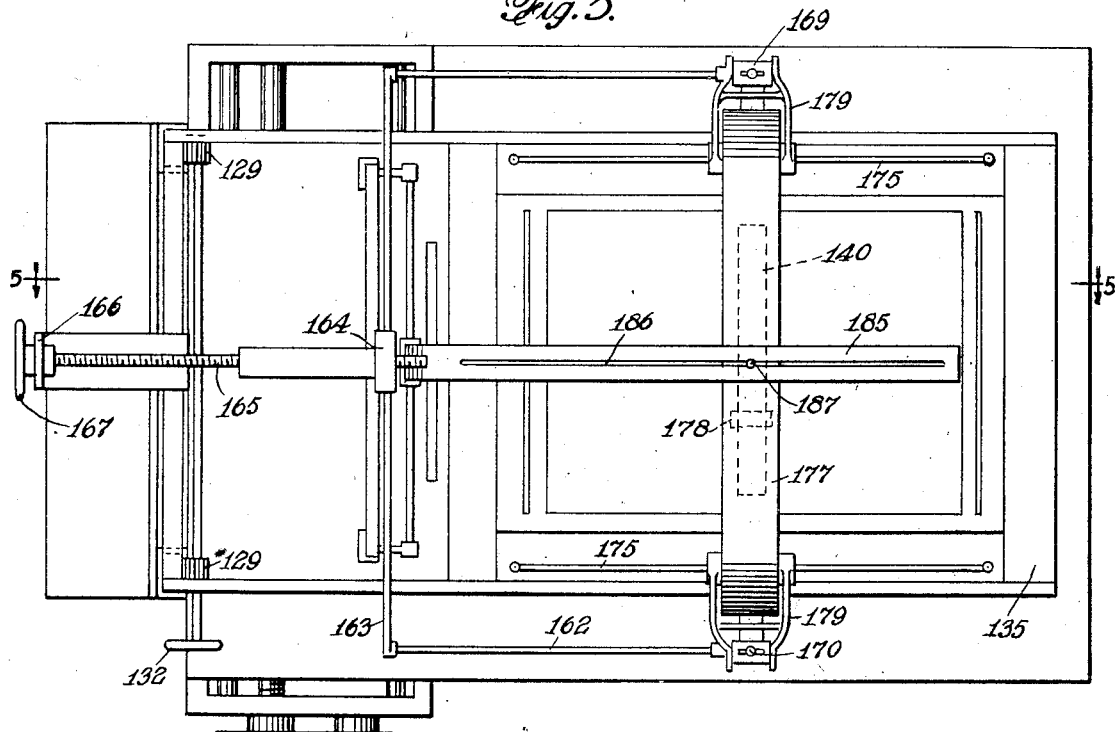
Figure 3 is a top plan view thereof.

The arms 155 are adjustably supported on rods 162 (Figure 3) by flanges 169 and set screws 170. The rods 162 are carried by arms 163 attached to a bracket 164, which is in threaded engagement with a rod 165 (Figures 1 and 3.) The rod 165 is mounted in a supporting bracket 166 which is attached to the bracket 125. A control knob 167 may be provided for effecting the necessary adjustment of the rod 165. By turning the rod 165, the bracket 164 is threaded longitudinally thereof, and, through the rods 162, shifts the arms 155, the box 148 and the shield 139 transversely of the plate 138.

The set screws 170 permit the arms 155 to be vertically adjusted on the rods 162 for lowering the box 148 out of engagement with the flange 150 and releasing the shield 139 for movement independently of the box 148. The shield 139 may then be shifted transversely so as to bring the aperture 140 to the extreme edge of the sensitized plate 138. In this way, the shield 139 provides a light seal for the plate 138 which permits the removable frame 136, together with this shield and plate, to be removed from the machine and to be taken into the developing room for the removal and development of the photographic material.

Figure 2:
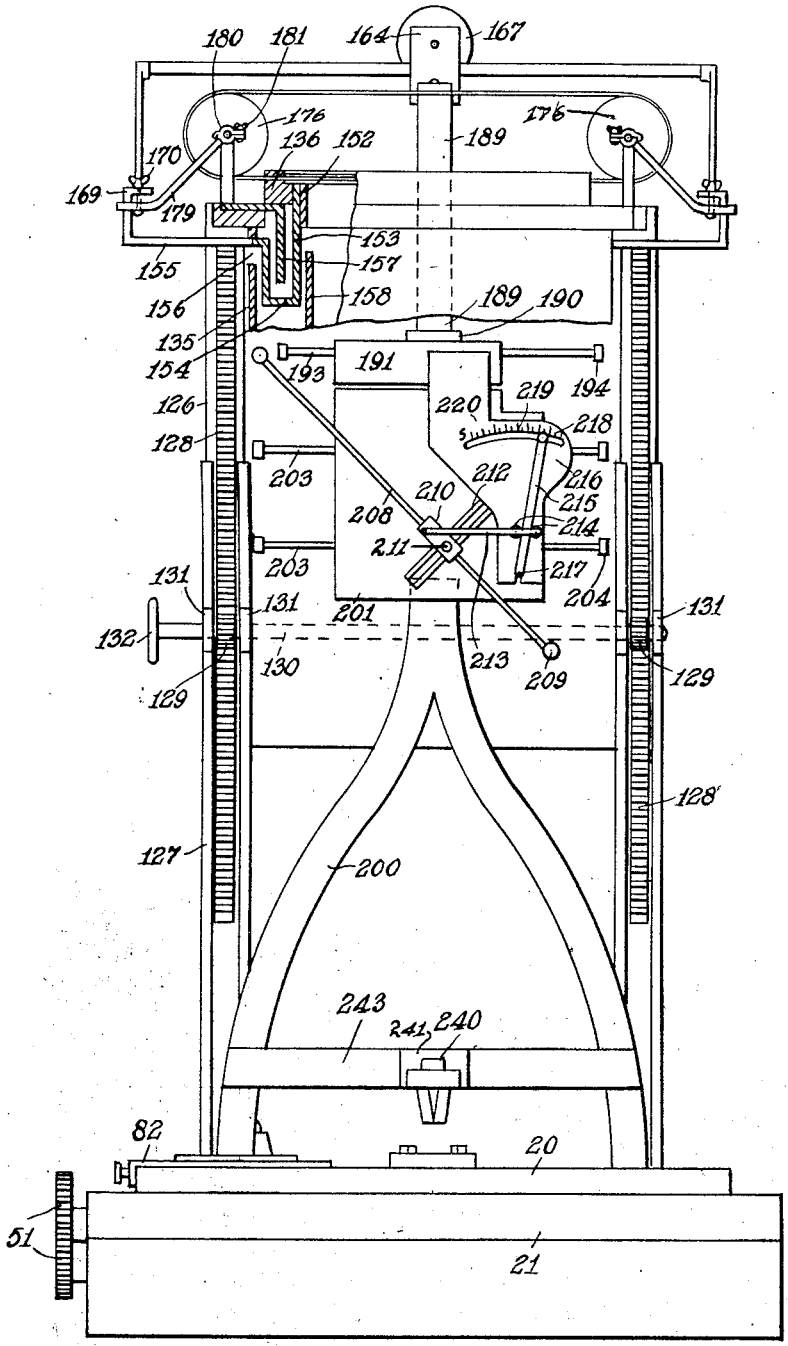
Figure 2 is a front elevation thereof with the camera bellows broken away to show the control mechanism and with parts of the plate-holder in section.

The removable frame 136 carries a pair of rods 175 (Figures 3 and 5) on which are mounted rollers 176 carrying an endless belt 177. The belt 177 extends underneath the sensitized plate 138 and above the aperture 140 of the shield 139, and is provided with a narrow aperture 178 to expose an element of the line being photographed, as, for example, a portion corresponding to a portion of a single letter. The belt 177 may be shifted transversely of the plate 138 by means of arms 179 which are attached to the rods 162 and are shiftable therewith. The arms 179 extend on opposite sides of the rollers 176 and are provided with split collars 180, as shown in Figure 2, which are held by clamping nuts 181 in engagement with the rods 175. The collars 180 may be keyed to the rods 175 for support. When the clamping nuts 181 are released, the split ends 180 of the arms 179 may be opened to permit the rods 175 to be removed therefrom, as, for example, when the removable frame 136 is to be taken from the machine.

The arms 179, being attached to the rods 162, cause the belt 177 to be shifted transversely of the plate 138 with the shield 139, so that the belt always occupies a position over the portion of the sensitized plate on which the selected line of the copy is being photographed. It is to be understood, of course, that the width of the aperture 140 in the shield 139 and the size of the aperture 178 in the belt 177 may be made adjustable to accommodate various sizes of type, or, if desired, the adjustment may be made by replacing the shield and belt with other shields or belts designed in accordance with the various type sizes.

The belt 177 is shifted longitudinally of the line by means of a bracket 185 having an elongated slot 186 therein through which extends a pin 187 attached to the belt 177. The pin is slidable longitudinally in the slot 186 as the belt 177 is shifted transversely.

The bracket 185 is provided with a downwardly extending arm 189 (Figures 1 and 2) which is slidably mounted in a boss 190 carried by a plate 191. The plate 191 is provided with ears 192 which are slidably mounted on a transverse rod 193 carried by brackets 194 attached to a base plate 195. The base plate 195 is supported by a suitable bracket 196 attached to the stationary support 127. The arm 189 is slidable vertically in the boss 190 so as to permit vertical adjustment of the plate-holder.

The plate 191 is shifted transversely in accordance with the scanning movement desired, by a suitable mechanism which adjustably connects the same to the carriage plate 41.

In the embodiment shown in Figures 1 and 2, this mechanism comprises supporting arms 200 attached to the carriage plate 41 and carrying a feed plate 201. The feed plate 201 is slidably mounted, as by ears 202, for transverse movement on rods 203 which are supported by brackets 204 on the base plate 195.

A diagonal rod 208 is also mounted on the base plate 195, as by brackets 209, and carries a slide 210 provided with a pin 211 extending into an inclined slot 212 formed in the feed plate 201. The slide 210 carries an arm 213 which is rigidly secured thereto and is provided at its ends with rollers 214 engaging an arm 215 which is carried by a bracket 216 attached to the plate 191. The arm 215 is pivotally mounted on the bracket 216, as at 217, and is provided at its free end with a set screw 218 which is adjustable in an arcuate slot 219 to vary the angular position of the arm 215. A scale 220 may be provided for facilitating this adjustment.

It will be noted that transverse movement of the feed plate 201, caused by transverse movement of the carriage plate 41, acting through the pin 211 in the slot 212, shifts the slide 210 along the rod 208. The arm 213, attached to the slide 210, causes the arm 215 and the bracket 216 to be shifted transversely at a speed different from the speed of movement of the feed plate 201, and which bears a ratio thereto dependent upon the angular position of the arm 215. In this way, the belt 177 is shifted longitudinally of the line in accordance with the movement of the carriage plate 41, but at a speed determined by the adjustment of the arm 215.

The frame 135 carries the camera bellows D to which the lens-holder C is attached. This lens-holder is mounted on a bracket 225 which is adjustably secured, as by means of a thumb nut 226, on an arm 227 which is attached to the bracket 125. Adjustment of the bracket 225 permits the focus to be changed as desired, for properly focusing the image of the copy on the plate 138. Vertical adjustment of the plate-holder by adjusting handle 132 provides for enlarging or reducing the size of the image, as may be required. A suitable shutter may be associated with the lens-holder C to control the exposure.

*Photo-electric justifying control*

The copy to be justified may comprise a plurality of spaced words 230, as indicated in Figure 15, which have been set up by suitable means, such as by a typewriter, or by a phototype-composing machine. In setting up this copy, a justifying dot 232 is made below the line at each space between words. This dot 232 is made in any convenient manner, as, for example, by providing the space bar of the typewriter or phototype-composing machine with means to print or photograph the dot at each space and at a position slightly below the line.

The justifying mechanism is actuated by a photoelectric cell, the energization of which is controlled by the passage thereof over one of the dots 232, as shown in Figure 15. This mechanism may comprise a housing 233 carrying a light source 234, a suitable condenser lens 235, and a light tube 236, through which the light from the source 234 is focused sharply on the dot 232. The light reflected from the copy is transmitted through a tube 237 to a photo-electric cell 238 which may be of any standard construction.

The housing 233 is mounted on a frame 239 attached to an arm 240. This arm 240, as shown in Figure 1, is slidably mounted in a boss 241 carried by a yoke 243, attached to the arms 200, and is adjustably held by a set screw 242. The photo-electric control mechanism is accordingly shifted along the line being photographed, with the arms 200 and with the carriage plate 41, so that the beam of light from the source 234 is caused to traverse a path slightly below the line of characters in which the dots 232 are located.

The arrangement is such that the energization of the photo-electric cell 238 is changed whenever a dot 232 is scanned by the light beam. This energization of the photo-electric cell is used to actuate the solenoid 26, shown in Figure 4.

The energization circuit is shown diagrammatically in Figure 16. In this embodiment, the photo-electric cell 238 is connected through a source of potential 245 to an amplifier 246 which is adapted to amplify the impulses derived from the photo-electric cell and to impress the amplified impulses upon a relay 247, by means of which the solenoid 26 is actuated. It is to be understood that the amplifier 246 and the relay 247 may be of any standard construction which is adapted to cause a momentary enerzigation of the solenoid 26 for each energization of the photo-electric cell 238 caused by the passage of the light beam over one of the dots 232.

Energization of the solenoid 26 shifts the rod 25 (Figure 4) longitudinally until the pin 38 engages the bar 39. This causes the pin 29 to shift the frame 20 longitudinally a distance determined by the position of the bar 39, which is to be adjusted, in the manner to be later described, in accordance with the total amount of justification required.

A light source 248 may be mounted on a bracket 249 attached to the arm 240. A condenser lens 244 may be associated therewith to focus the light from the source 248 as a bright spot of limited area on the copy for illuminating the same for photographing purposes.

The modified form of photo-electric control, shown in Figure 14, operates in a manner similar to that of Figure 15, except that in this embodiment justifying dots 250 are made transparent instead of opaque and permit the light beam to pass through the copy. The dots may, for example, comprise small perforations formed in the copy itself. In this embodiment, a light source 251 is mounted below the copy and is adapted to direct a beam of light through a condenser lens 252 and a light tube 253, through the transparent dot 250, and through a light tube 254, to a photo-electric cell 255 which is mounted in a housing 256 similar to the housing 233 above-mentioned and carried by the arms 240 in the same manner.

It is to be understood that the dots 232 or 250 may take various forms. For example, the dot 232 of Figure 15 may be adapted to increase the light reflected onto the photo-electric cell, or, in the case of a transparent copy, the dot 250 of Figure 14 may be made opaque so as to decrease the light transmitted to the cell. In any event, the arrangement is such that the energization of the cell is changed whenever the light beam registers with one of these dots.

*Operation*

This machine is intended for the justification of a copy which has been made by typing, printing or photo-composing and in which the lines are non-uniform in length or are otherwise improperly positioned. The machine photographs the copy line-for-line and automatically varies the space between words in each line so as to cause each of the lines to have the desired length. The justification is accomplished automatically as the machine traverses or scans each line. Provision is made for measuring the required justification for each line and setting the machine in accordance therewith.

In the embodiment above-described, the copy may be composed of a plurality of lines, each of which contains the plurality of words 230 (Figure 15) separated by spaces below which the justifying dots 232 are positioned. As previously described, this copy may have been made on a typewriter, phototype-composing machine, or in any other suitable manner, and may have been corrected for typographical errors and the like so that it is only necessary to copy the same in justified form to produce the final copy from which the printing plate may be made in the usual manner, as, for example, by suitable photo-etching, photo-lithographic or offset processes.

The copy 77 is placed upon the copy support 70 with its edges suitably engaged under the flanges 78 and is held in position by means of suction applied to the various apertures 73. When thus positioned, the copy may be examined and any major changes which may be required may be made therein by cutting and rearranging the parts. This is readily accomplished by the knives 92 and 93, as shown in detail in Figures 8 and 9. If, for example, the spacing between lines is to be changed, the longitudinally extending knife 92 may be used for cutting the paper between the selected lines, after which the two parts of the copy may be manually shifted to effect the desired spacing. The suction of the copy support, however, will hold the parts in the rearranged position without requiring further attention. If an entire line is to be shifted transversely, as, for example, in centering a heading, this line may be cut from the copy by use of the knife 92, as above-mentioned, and may be manually shifted longitudinally so as to properly position the same with respect to the finished copy.

If the copy has been carefully set up initially, a substantial number of lines will be found to be of proper length or to require only a slight justification. This may be effected, for example, by laterally shifting the last word only. Such lines can be readily justified by using the knives 92 and 93 to cut the last word out of the copy, after which it is manually shifted to the justified position. It is to be understood, of course, that this procedure could be used, if desired, for separating any number of words and is not confined to the last word in each line. As a general proposition, however, it will be found more expedient to justify a plurality of words photographically by the automatic means to be described, rather than manually by cutting and physical rearrangement of the copy. When only a slight amount of justification is required, however, it may be more convenient to effect the physical rearrangement of one or more of the final words as above-mentioned.

After the copy has been proof-read, corrected and rearranged as above-mentioned, it is in condition for photographing and final justification.

For photographing the above-mentioned copy, the rods 99 and the knife mechanism may be slidably shifted to a position out of the range of the camera, or the mechanism may be released by means of the catch member 108 and may be pivoted about the rod 102 so as to expose the entire copy.

A plate-holder is now placed in the camera, the arms 155 are attached to the rods 162 by means of the set screws 170, and the arms 179 are positioned on opposite sides of the rollers 176 and are connected to the rods 175 by means of the clamping nuts 181. This operatively connects the box 148 to the shield 139. The control knob 167 is then operated to shift the rods 162, and the shield 139 which is actuated thereby, into a position such that the aperture 140 in the shield registers with the portion of the plate 138 on which the first line of the copy is to be photographed.

The carriage plate is now released from the threaded shaft 49 by actuation of the handle 62 and is shifted laterally to a position corresponding to the beginning of the line. This shifting of the carriage plate operates, through the arms 200, to shift the feed plate 201 and, through the speed-changing linkage, shifts the plate 191 and the arm 189 carrying the bracket 185. The arrangement is such that the bracket 185 thus shifts the belt 177 so that the aperture 178 therein registers with the beginning of the line to be photographed.

The speed-changing mechanism shown in Figure 2 may be adjusted in accordance with the length of the line to be photographed, and is adapted to effect any desired ratio between the carriage feed and the movement of the bracket 185. This adjustment may be made by varying the angular position of the arm 215 which may be set in accordance with the scale 220.

It will be noted that shifting of the feed plate 201 causes the slide 210 to move along the rod 208. The arm 213 carried by slide 210 accordingly slides along the arm 215 and causes feeding movement of the plate 191 dependent upon the angular position of the arm 215. It is, of course, to be understood that other speed-changing mechanisms may be used, if desired, for obtaining the necessary feeding movement of the bracket 185.

With the belt 177 and shield 139 in position, the lens-holder C and the height of the plate-holder are adjusted for focusing and for obtaining the desired reduction or enlargement of the image, so that the reproduced copy will be photographed in the desired size.

The apparatus as now set up is in position for photographing the first line. The shutter associated with the lens C is then opened and the handle 62 released to connect the carriage feed to the threaded shaft 49 which is continuously rotated by the motor 50. This feeds the carriage and causes the belt 177 to be actuated so that the aperture 178 continuously traverses or scans the line to be photographed. When the carriage reaches the end of the line, it may be released manually by the handle 62, as above-mentioned, and returned for photographing the next line, the shutter, of course, being closed during this portion of the operation. The machine has been shown, for simplicity, as designed for the manual return of the carriage and operation of the shutter.

The control handle 167 is now operated to shift the shield 139 into position for photographing the next line, the carriage is returned to the beginning of its stroke, and the above operation is repeated. In this way, the copy is photographed line-by-line onto the plate 138.

In the operation thus far described, the spacing of the photographed words in each line corresponds to that of the copy. This operation is suited for lines which have been previously justified or require no further justification. When a line is reached, however, that requires justification, the apparatus is set up as above described. The gage 82 (Figure 4) is shifted to a position registering with the line to be photographed and the amount of justification required is read on the scale 83, this scale being previously set on the gage 82 so that the zero point thereof corresponds to the desired length of line. If the scale indicates, for example, that the line must be increased in length by a certain amount, say by three units, the bar 39 (Figure 4) is shifted to an angular position, as shown by the scale 43, corresponding to a correction of three units.

The pin 29 is now inserted in the bracket 32 in a position to engage the groove 28 of the head 27 which is adapted to produce a positive correction. In the embodiment shown in Figure 4, this would be the lower groove 28.

The photo-electric circuit is now closed, the light source 234 is energized, and the housing 233 of the photoelectric cell is adjusted by shifting the arm 240 in the boss 241 (Figure 1) so that the path of the light from the light source 234 falls along the row of scanning dots 232.

The carriage is now connected to the feed mechanism and the line is scanned and photographed in the manner above described. In this case, however, the photo-electric control mechanism is fed, with the carriage, along the row of justifying dots 232. When the light beam from the source 234 encounters a justifying dot 232, the energization of the photo-electric cell is changed and the solenoid 26 is momentarily energized. This energization of the solenoid shifts the rod 25 longitudinally until the pin 38 engages the bar 39 which forms a stop therefor. The pin 29 riding in the lower groove 28, as seen in Figure 4, thus shifts the frame 20 downwardly or toward the right-hand end of the line being photographed, thereby increasing the width of the space between adjacent words by an amount determined by the angularity of the bar 39 and of the groove 28.

After the light beam passes the justifying dot 232, the next word is photographed in the usual manner. In the space following the next word, another dot 232 is encountered which again energizes the solenoid 26. The bar 39 has, however, by this time shifted, with the carriage, to a position such that further movement of the rod 25 is permitted; that is, the entire bar 39 has shifted parallel to itself and in a direction normal to the rod 25. This next energization of the solenoid 26 causes the rod 25 to be further shifted until the pin 38 again engages the bar 39, thereby effecting a further displacement of the frame 20 and increasing the length of the second space in the photographed line. This is repeated at each time a justifying dot is encountered until at the end of the line the last justifying dot is reached and causes the pin 38 to engage the bar 39 in its final position. This final position of the bar determines the total movement of the rod 25, which in turn determines the total distance by which the frame 20 has been shifted. This total distance corresponds to the three units above mentioned, by which the line was short of the required justified length.

It will be noted that the only setting of the bar 39 required is that of the total justification and that the distribution of this justification throughout the length of the line is determined by the number and position of the justifying dots 250. Regardless of the number of these dots, the total movement of the rod 25 will be the same inasmuch as at the last actuation the pin 38 engages the bar 39 in its final position. In the setting of the bar 39, it is not necessary to take into account the number of words but only the total correction. The distribution of the justification, as above described, is taken care of automatically by the number and position of the justifying dots 250.

Figure 4:
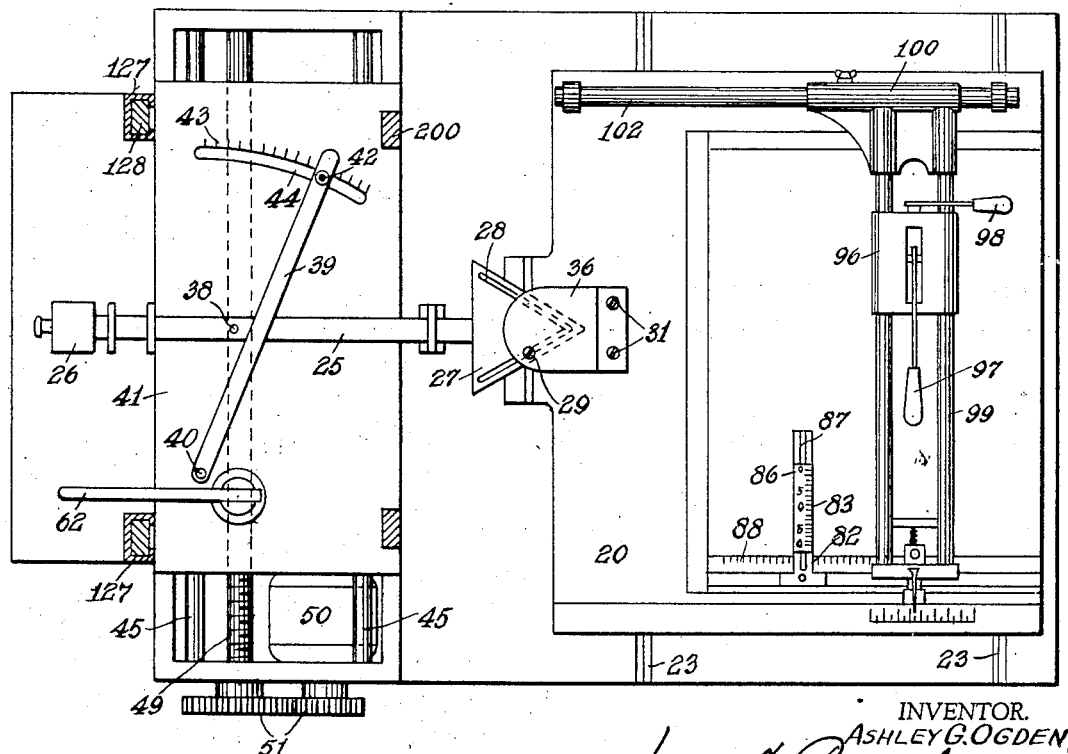
Figure 4 is a section taken on the line 4—4 of Figure 1, showing the construction of the copy-holder and support.

In the event that the line on the original copy is long instead of short, the justification is accomplished in the same manner, with the exception that the pin 29 is positioned in the upper groove 28, as seen in Figure 4, instead of the lower groove, thereby shifting the frame 20 toward the left end of the line being photographed at each actuation of the solenoid 26. In the event that no justification whatever is required, the photoelectric circuit may be de-energized or the pin 29 may be entirely removed. The adjustment may be made to the right or left depending upon whether the copy is a positive or a negative or on the position of the copy in the copy-holder.

It is to be understood that when the next line is to be photographed, the gage 82 is shifted for measuring the required justification, the bar 39 is again adjusted, and the operation is repeated. This is continued until the entire copy has been photographed on the plate 138.

In the embodiment shown, the photo-electric cell is shifted manually by sliding the arm 240 in the boss 241 and locking the same by means of the set screw 242 after each line which is to be justified. It is to be understood, of course, that this control of the photo-electric mechanism may be made automatic and may be made in accordance with the position of the shield 139 by connecting the same for operation with the control knob 167. The control has been shown as manual for simplicity of description.

After the entire copy has been photographed line-for-line in the manner above described, the plate-holder may be removed from the machine and taken to the developing room for development, or stored as may be required. This may be effected by first releasing the arms 155 from the rods 162, thereby permitting the box 148 to be displaced downwardly and release the shield 139. The shield 139 may then be shifted manually to bring the aperture 140 to the extreme end of the sensitized plate 138 so as to effect a light seal, or, if desired, a separate shield may be positioned over the shield 139. The arms 179 are now released from the rods 175, and the plate-holder, with the rods 175, rollers 176 and belt 177, may be removed from the machine. The final image on the plate 138 will be in justified form and will be ready for transferring to the printing plate in any well-known manner.

Figure 6:
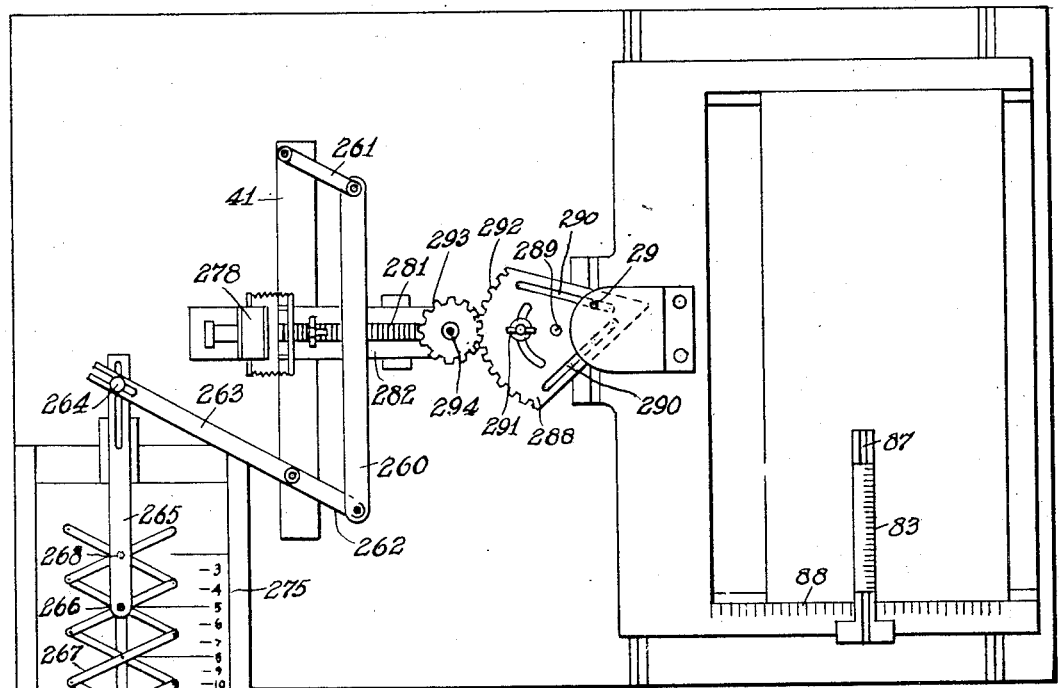
Figure 6 is a view similar to Figure 4 illustrating a different embodiment of the invention.
Figure 7:
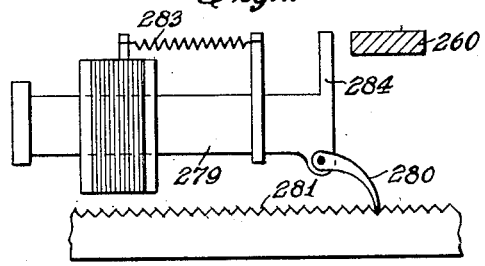
Figure 7 is a detail view of the solenoid-operated pawl and ratchet mechanism of Figure 6.

*Figures 6 and 7*

A different form of justifying mechanism is shown in Figures 6 and 7. This form may be used to replace the angular bar 39 of Figure 4, if desired. In this embodiment, a bar 260 is mounted for parallel movement on brackets 261 and 262 which are shown as pivoted to the carriage plate 41. These brackets may, however, be mounted on the frame of the machine, if desired. The bracket 262 may be extended to provide a lever 263 which is connected by a pin 264 to a rod 265. The rod 265 is connected at its end by a pin 266 to the second unit of an expanding pantograph 267. The pantograph 267 is pivotally mounted at one end by a pin 268 to a plate 269 and its other end is guided for sliding movement in said plate by a thumb screw 270 extending through a slot 271 in said plate. The plate 269 is mounted for sliding movement in a frame 274 and is provided with a scale 275 which is graduated to read in units of justification.

In this embodiment, a solenoid 278 actuates a plunger 279 (Figure 7) carrying a pawl 280 engaging a rack 281 which is mounted on a sliding rod 282 (Figure 6). The plunger 279 is held retracted by a spring 283 and carries a flange 284 which is adapted to engage the bar 260 for limiting the movement of the plunger. The rod 282 carries a triangular head 288 which is pivoted thereto, as at 289, and is provided with a pair of oppositely inclined slots 290 in which the pin 29 may be inserted, as shown in Figure 4. The pin 29 is adapted to cause shifting movement of the frame 20 in the manner previously described. The head 288 may be pivotally adjusted on the rod 282 and may be held by a thumb screw 291. The pivotal adjustment of this head 288 may be effected by means of a rack 292 carried thereby and engaging a pinion 293 which is pivotally mounted on the rod 282 and may be provided with an adjusting handle 294.

In the operation of this embodiment of the invention, the amount of justification is measured by means of the scale 83 in the manner previously described. The number of spaces in which the justification is to be distributed is also noted. For example, assume that the line is to be increased in length by 16 units and that the line consists of 6 words, so that the justification is to be distributed in 5 spaces. Suitable adjustment for accomplishing this is now made as follows:

The plate 269 is first adjusted so that the zero mark on the scale 275 corresponds to the position of the end of the justified line. The point of the pantograph corresponding to the number of spaces is now selected. In the example shown, the 5th point 296 is selected. The pantograph is expanded until this selected 5th point registers in position with the number on the scale 275 corresponding to the total justification. In the embodiment shown, the 5th point 296 is adjusted to register with the number "16" on the scale 275 which corresponds to the predetermined justification. The movement of the pantograph occasioned by the setting thereof causes the rod 265 to be shifted a corresponding distance, thereby shifting the lever 263 and the bar 260 a distance proportional to the movement of the pantograph 267. It will be noted that this movement takes into effect both the total justification and the number of spaces in which this is to be distributed, the division being automatically accomplished by the selection of the point of the pantograph corresponding to the number of spaces. The position of the bar 260 accordingly represents the total justification divided by the number of spaces. At each actuation of the solenoid 278, corresponding to the solenoid 26 of Figure 4, the plunger 279 and the rack 281 are moved until the stop 284 engages the bar 260. When the solenoid is de-energized, the spring 283 returns the plunger 279 to its original position. Thereby, at each actuation of the solenoid, the rack 281 and the rod 282 to which it is attached, are shifted by equal successive distances, the total of which will correspond to the total justification.

The pivoted head 288 permits the ratio of movement of the frame 20 to the rod 282 to be adjusted as desired. This adjustment may be made in accordance with the physical dimensions of the various control elements.

This embodiment of the invention has the advantage that the justification is uniformly distributed throughout all of the spaces, while the embodiment illustrated in Figure 4 has the advantage of simplicity of adjustment. In an ordinary printed line consisting of a number of words, the variations in spacing between words caused by the mechanism of Figure 4 would not be appreciable. In the event that absolute uniformity is required, however, the embodiment of Figures 6 and 7 may be used.

Figures 10, 11 and 12

In the form of the invention above described, the justification is effected by shifting the copyholder longitudinally of the line as it is being photographed. In certain instances it may be desired to maintain the copy-holder stationary. In that event, the plate-holder itself may be shifted longitudinally of the line. Mechanism for accomplishing this is shown in Figures 10, 11 and 12.

Referring to these figures, the plate-holder comprises a frame 300 mounted on a base 301 which supports the lens-holder 302 by means of a bracket 303. A suitable camera bellows, similar to that shown in Figure 1, may also be used if desired.

The frame 300 is slidably mounted on rails 305 for movement longitudinally of the lines being photographed. A removable frame 306 is mounted in the frame 300 and carries a sensitized plate 307 and a shield 308. The shield 308 extends through slots 309 in the frame 306 and is provided with an aperture 310 adapted to expose a portion of the plate 307 corresponding to a photographed line. A box 311, having inclined sides 312, is positioned to extend into the aperture 310 of the shield 308. This box 311 is provided with ends 314 which are engaged by arms 315 extending outwardly through slots 316 in the frame 300. Each arm 315 is bent downwardly, as at 317, to provide clearance for a light baffle 318 which may be attached to the bracket 303 and extends downwardly past the slot 316. A second baffle 319 may be attached to the frame 300, if desired, for completing the light seal.

The frame 306 also carries rods 322 on which rollers 323 are mounted. These rollers 323 carry a belt 324 extending beneath the plate 307 and having an aperture 325 adapted to expose an element of the line being photographed. A pair of arms 326, attached to the arms 315, may be positioned on opposite sides of the rollers 323 and may be provided with split collars 327 adapted to be clamped about said rods by set screws 328, whereby the rollers 323 are shifted transversely with the box 311 and the shield 308. The collars 327 may be keyed to the rods 322 for support.

For controlling the transverse position of the box 311, a link 340 is provided. The link 340 is connected to a link 344 (Figure 11) which is threaded on a rod 345 controlled by a handle 346. The arrangement is such that operation of the handle 346 shifts the box 311, the shield 308 and the belt 324 transversely of the sensitized plate. In the embodiment shown, this control is effected manually at each line of the copy to be photographed.

For operating the belt 324, there is provided a bracket 348 which is mounted on a carriage 349 slidable on rods 350 held in a frame 351 and carrying a releasable nut 352 which is adapted to engage a threaded rod 353 which is driven by a motor (not shown) through a set of gears 355. A handle 356 may be used for releasing the nut 352 from the rod 353 when the carriage feed is to be interrupted. In this embodiment, the movement of the carriage, through the bracket 348, causes movement of the belt 324 which is adapted to cause the aperture 325 therein to progressively scan the line to be exposed for photographing. The carriage 349 also carries a bracket 330 on which is adjustably mounted a photo-electric control mechanism 331 by means of a rod 332 held in a boss 333 attached to the bracket 330 and secured by a set screw 334. The photo-electric control mechanism is similar to that described in the previous embodiment of the invention and is shifted longitudinally of the line with the carriage 349. The photo-electric control mechanism is manually adjusted transversely for scanning successive lines.

For justification purposes, a justifying rod 360 is mounted on the base 301 and carries a triangular head 361 having a pair of slots 362 therein, through which a pin 363 extends into the frame 300. The rod 360 is provided with a pin 364 which is adapted to engage a bar 365 pivoted, as at 366, to the carriage 349 and adjustable angularly by means of a set screw 367 engaging an arcuate slot 368 in the carriage 349. A suitable scale 369 may be provided to facilitate this adjustment.

The operation of this embodiment is generally similar to that of the embodiment previously described. The description of the parts which operate in a similar manner will accordingly not be repeated. In general, the belt 324 is shifted for progressively scanning each line by means of the carriage 349 and adjustment between lines is effected by means of the handle 346. For justification purposes, the bar 365 is adjusted, in the manner described in connection with the bar 39 in Figure 4, to an angle depending upon the total justification required. At each space, the rod 360 is shifted longitudinally until the pin 364 engages the bar 365, thereby shifting the frame 300 longitudinally of the line being photographed. This actuation of the rod 360 is shown in Figure 10 as manual. The manual adjustment is shown in Figure 10 merely for ease of description and to avoid repetition. It is to be understood that the plate-holder of Figures 10–12 may replace the plate-holder B of Figure 1 in the mechanism therein described and that the method of operation of the justifying mechanism is the same as that above set forth. It is also to be understood that the justifying mechanism of Figures 6 and 7 may be used in this embodiment of the invention if desired.

Figures 17 and 18

One embodiment of feed mechanism for the carriage has been described above. A further embodiment thereof is shown in Figures 17 and 18. In this embodiment, the arms 200 and stationary supports 127 are similar to the parts shown in Figure 2 and support and drive the carriage in the manner therein set forth. The arms 200 of Figures 17 and 18 are mounted for rolling movement in a slot 370 formed in a guide bracket 371. One of the arms 200 is also provided with a downwardly extending arm 372 carrying a boss 373 in which a rod 374 is mounted. This rod carries a photoelectric control mechanism 375 which is attached to a sleeve 376 adjustably mounted on the rod 374 by a set screw 377. The arms 200 are actuated by a link 378 which is adjustably connected by means of a pin 379 and a slot 380 to an arm 381 driven by a motor 382. The link 378 is pivotally connected by a pin 384 to the lower part of an arm 200.

In this embodiment, the rotation of the motor 382 causes the link 378 to be shifted to and fro, thereby causing a corresponding to and fro movement of the arms 200. This to and fro movement may constitute the automatic carriage feed and return, and provides for successively feeding and returning the carriage for scanning the various lines of the copy. Manual attention to this feature of the operation is accordingly obviated.

During the return movement of the carriage, the necessary adjustments for scanning and justifying the next line may be manually effected. It is to be understood that means may be provided for automatically closing the shutter at the end of the carriage travel so that it is maintained closed during the return movement thereof. By adjusting the link 378 in the slot 380, the length of the feed stroke may be varied as desired. It is to be understood that the various details of the apparatus of Figures 17 and 18 are similar to those in the embodiment of the invention described in detail in connection with Figures 1 and 2.

While certain specific embodiments of the invention have been shown for purpose of illustration, it is to be understood that various changes and modifications may be made therein as will readily appear to a person skilled in the art. The invention is to be limited only in accordance with the following claims when interpreted in view of the prior art.

I claim:

1. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, means interconnecting said carriage and scanning means to continuously feed said scanning means along the individual lines for scanning purposes, and means to synchronize the relative movement of the carrier and the scanning means in accordance with the focus of the camera.

2. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, means interconnecting said carriage and scanning means to continuously feed said scanning means along the individual lines for scanning purposes, and change speed mechanism associated with said carriage to permit adjustment and control of the relative movement between said scanning means and said carriage.

3. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, and means interconnecting said carriage and scanning means to continuously feed said scanning means along the individual lines for scanning purposes, said interconnecting means including an adjustable change speed mechanism to permit relative adjustment of the movements thereof.

4. A photographic justifying machine comprising a copy-holder to hold a copy to be photographed, a camera including a plate-holder mounted to photograph said copy, scanning means associated with said plate-holder, means to shift said scanning means transversely between lines, a carriage connected to feed said scanning means along the individual lines for scanning purposes, and change speed mechanism interconnecting said scanning means and said carriage, said change speed mechanism including a feed plate driven by said carriage, a second feed plate driving said scanning means and adjustable linkages interconnecting said feed plates causing controlled relative movement therebetween.

5. A photographic justifying machine comprising a copy-holder to hold a copy to be photographed, a camera including a plate-holder mounted to photograph said copy, scanning means associated with said plate-holder, means to shift said scanning means transversely between lines, a carriage connected to feed said scanning means along the individual lines for scanning purposes, and change speed mechanism interconnecting said scanning means and said carriage, said change speed mechanism comprising a feed plate driven by said carriage, a second feed plate driving said scanning means, a slide mounted for movement in a direction inclined to the direction of feed, a pivoted arm mounted on said second feed plate and angularly adjustable with respect to a normal to the direction of feed, and an arm carried by said slide and having means slidably engaging said pivoted arm for imparting feeding movement to said second feed plate, the adjustment of said pivoted arm being adapted to control the ratio of movement between said first and second feed plates.

6. A photographic justifying machine comprising a copy-holder to hold a copy to be photographed, a camera including a plate-holder mounted to photograph said copy, scanning means associated with said plate-holder, means to shift said scanning means transversely between lines, a carriage connected to feed said scanning means along the individual lines for scanning purposes, and feed means for said carriage comprising a continuously rotating arm and a link adjustably connected between said rotating arm and said carriage.

7. A photographic justifying machine comprising a copy-holder to hold a copy to be photographed, a camera including a plate-holder mounted to photograph said copy, scanning means associated with said plate-holder, means to shift said scanning means transversely between lines, a carriage connected to feed said scanning means along the individual lines for scanning purposes, guide means supporting said carriage for sliding movement, and feed means therefor comprising a continuously rotating arm and an adjustable link interconnecting said arm and said carriage.

8. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a second shield associated with said first shield and closing said aperture, said second shield having an aperture to expose an element of said line, and means shifting said second shield to continuously feed said last aperture along said line for continuouly scanning and photographing the same.

9. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, and means shifting said belt to continuously feed said last aperture along said line for continuously scanning and photographing the same.

10. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, a belt associated with said shield and closing said aperture, said belt having an aperture to expose an element of said line, means shifting said belt and said shield to expose successive lines, and mean continuouly feeding said belt to cause the aperture therein to continuously scan and photograph each line.

11. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, a box having an opening registering with said aperture and having inclined sides adapted to direct a cone of light thereto, means connecting said box to said shield for controlling thereby the transverse position of said shield, an arm carrying said box and extending to the outside of said plate-holder, a light seal associated therewith to prevent passage of light into said plate-holder, and mechanical means engaging said arm for causing transverse movement of said box to thereby shift said shield to expose successive lines.

12. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, a box having an opening registering with said aperture and having inclined sides adapted to direct a cone of light thereto, means connecting said box to said shield for controlling thereby the transverse position of said shield, an arm carrying said box and extending to the outside of said plate-holder, a light seal associated therewith to prevent passage of light into said plate-holder, mechanical means engaging said arm for causing transverse movement of said box to thereby shift said shield to expose successive lines, and means releasing said arm from said mechanical means whereby said box is caused to release said shield to permit independent adjustment of the same.

13. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, a feed bracket engaging said belt to feed the aperture therein along said line for scanning and photographing the same, a carriage, means feeding said carriage, and means interconnecting said carriage and said bracket for causing feeding movement of said bracket.

14. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, a feed bracket engaging said belt to feed the aperture therein along said line for scanning and progressively photographing the same, feed means connected to actuate said bracket, and means for adjusting the relative movement between said bracket and said feed means.

15. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, a feed bracket, means feeding the same longitudinally of the lines to be photographed, and means connecting said bracket to said belt for thereby feeding the aperture in said belt along said line for scanning and progressively photographing the same, said connecting means comprising a pin carried by said belt and engaging an elongated slot in said bracket to permit said belt to be shifted transversely between lines.

16. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, means mounting said belt for transverse movement, shifting means associated therewith for shifting said belt transversely from line to line, and means releasing said belt from said shifting means to permit the belt to be removed with said plate-holder.

17. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, means shifting said shield to expose successive lines, a belt associated with said shield, said belt closing the aperture in said shield and having an aperture to expose an element of said line, rollers carrying said belt, means slidably mounting said rollers, and shifting means engaging said rollers to shift the same transversely for shifting the belt from line to line, said shifting means being adapted to release said rollers to permit the same to be removed with said plate-holder.

18. A photographic justifying machine comprising a copy-holder to hold a copy to be photographed, a camera including a plate-holder mounted to photograph said copy, a shield slidable in said plate-holder and having an aperture adapted to expose a portion of the plate corresponding to a single line, a belt associated with said shield, said belt closing the aperture in said shield and having an aperture to expose an element of said line, means shifting said belt and said shield transversely for exposing successive lines, and means releasing said shield and said belt from said shifting means to permit removal of the shield and belt with said plate-holder.

19. A photographic justifying machine comprising a copy-holder to hold a copy to be photographed, a camera including a plate-holder mounted to photograph said copy, scanning means associated with said camera, means to shift said scanning means transversely between lines, means to continuously feed said scanning means along the individual lines, and justifying means to cause relative shifting of said holders simultaneously with and during the scanning of each line, whereby the lines are photographed in justified form.

20. A photographic justifying machine comprising a copy-holder to hold a copy to be photographed, a camera including a plate-holder mounted to photograph said copy, scanning means associated with said camera, means to shift said scanning means transversely between lines, means to continuously feed said scanning means along the individual lines, and justifying means for relatively shifting said holders after the scanning of each word or group of words and simultaneously with the continuous scanning of said line so that the line will be photographed in justified form.

21. A photographic justifying machine for photographing in justified form a copy comprising a plurality of rows of characters arranged in groups which are separated by spaces, and having a row of designations disposed below each line with one of said designations registering with each of said spaces, said machine comprising a copy-holder to hold said copy, a camera including a plate-holder mounted to photograph said copy, means associated with said plate-holder for successively and progressively scanning said lines and said rows of designations, and means actuated by the scanning of each of said designations for causing a relative shifting between said holders, adapted to adjust the spacing between groups of characters so as to justify the photographed image.

22. A photographic justifying machine for photographing in justified form a copy comprising a plurality of rows of characters arranged in groups which are separated by spaces, and having a row of designations disposed below each line with one of said designations registering with each of said spaces, said machine comprising a copy-holder to hold said copy, a camera including a plate-holder mounted to photograph said copy, means associated with said plate-holder for successively and progressively scanning said lines, photo-electric means movable with said scanning means for scanning the rows of designations, and means actuated thereby in response to the scanning of each designation for relatively shifting said holders so as to adjust the spacing between groups of characters for justifying the photographed image.

23. A photographic justifying machine for photographing in justified form a copy comprising a plurality of rows of characters arranged in groups which are separated by spaces, and having a row of designations disposed below each line with one of said designations registering with each of said spaces, said machine comprising a copy-holder to hold said copy, a camera including a plate-holder mounted to photograph said copy, means associated with said plate-holder for successively and progressively scanning said lines, photo-electric means movable with said scanning means, said photo-electric means comprising a source of light, means to focus light therefrom on said rows of designations, a photo-electric cell responsive to light reflected from said rows and actuated when each designation is scanned, and means responsive to actuation of said photo-electric cell for causing relative shifting movement between said holders for adjusting the spacing between groups of characters so as to produce a justified image.

24. A photographic justifying machine for photographing in justified form a copy comprising a plurality of rows of characters arranged in groups which are separated by spaces, and having a row of designations disposed below each line with one of said designations registering with each of said spaces, said machine comprising a copy-holder to hold said copy, a camera including a plate-holder mounted to photograph said copy, scanning means for successively and progressively scanning said lines, a feed carriage connected to feed said scanning means along the respective lines of said copy, and photo-electric control means mounted for movement with said carriage, said photo-electric control means comprising means to scan said rows of designations and to produce an impulse when each designation is reached, and means actuated by each impulse to cause relative shifting movement between said holders, for adjusting the spacing between characters so as to produce a justified image.

25. A photographic justifying machine comprising a copy-holder to hold a copy to be photographed, a camera including a plate-holder mounted to photograph said copy, scanning means associated with said camera for progressively and successively scanning the various lines on the copy, and means to cause relative shifting movement between said holders, said last means comprising an arm connected to cause sliding movement of one of said holders in a direction longitudinal of the lines being photographed, means to actuate said arm, and adjustable means to limit the movement thereof, said last means comprising a stop member adjustable in accordance with a predetermined correction in spacing between characters or groups of characters in said line.

26. A photographic justifying machine comprising a copy-holder to hold a copy to be photographed, a camera including a plate-holder mounted to photograph said copy, scanning means associated with said camera for progressively and successively scanning the various lines on the copy, a feed carriage connected to actuate said scanning means, an arm connected to one of said holders for causing relative movement between said holders adapted to correct the spacing in the photographed image for justification purposes, stop means for limiting movement of said arm, said stop means comprising a bar movable with said carriage and inclined with respect to the normal to said arm, whereby the limit of movement of said arm increases as the carriage is advanced, and means adjusting said arm to permit a predetermined total movement of said arm adapted to cause the required justification of each line.

27. A photographic justifying machine comprising a copy-holder to hold a copy to be photographed, a camera including a plate-holder mounted to photograph said copy, scanning means associated with said camera for progressively and successively scanning the various lines on the copy, a feed carriage connected to actuate said scanning means, an arm connected to one of said holders for causing relative movement between said holders adapted to correct the spacing in the photographed image for justification purposes, a bar for limiting the movement of said arm, means adjusting said bar in accordance with the justification requirements, said last means comprising an expansible pantograph having a plurality of expansible links, a scale associated therewith having graduations to designate the total units of justification, said pantograph being connected so that a selected point corresponding to the number of spaces in the line may be adjusted in accordance with said scale to thereby cause an adjustment of said bar proportional to the total justification divided by the number of spaces in which the justification is to be distributed.

28. A photographic justifying machine comprising a copy-holder to hold a copy to be photographed, a camera including a plate-holder mounted to photograph said copy, scanning means associated with said camera for progressively and successively scanning the various lines on the copy, means effecting relative movement between said holders for justification purposes comprising an arm extending transversely of one of said holders, said arm having a head provided with a pair of oppositely inclined slots, means associated with one of said slots to cause longitudinal movement of said holders in a predetermined direction, means to limit the movement of said arm, and means to adjust said last means in accordance with the justification requirements.

29. A photographic justifying machine comprising a copy-holder to hold a copy to be photographed, a camera including a plate-holder mounted to photograph said copy, scanning means associated with said camera for progressively and successively scanning the various lines on the copy, an arm connected to one of said holders to shift the same longitudinally of the lines being photographed so as to effect justification, stop means for limiting movement of said arm in accordance with the justification requirements, electro-magnetic means actuating said arm, and means energizing said electromagnetic means at predetermined points during the scanning of each line.

30. A photographic justifying machine comprising a copy-holder to hold a copy to be photographed, a camera including a plate-holder mounted to photograph said copy, scanning means associated with said camera for progressively and successively scanning the various lines on the copy, an arm connected to one of said holders to shift the same longitudinally of the lines being photographed so as to effect justification, stop means for limiting movement of said arm in accordance with the justification requirements, electro-magnetic means actuating said arm, and means associated with said copy for energizing said electro-magnetic means at predetermined points during the scanning of each line.

31. A photographic justifying machine for photographing in justified form a copy comprising a plurality of rows of characters arranged in groups which are separated by spaces, and having a row of designations disposed below each line with one of said designations registering with each of said spaces, said machine comprising a copy-holder to hold said copy, a camera including a plate-holder mounted to photograph said copy, means associated with said plate-holder for successively and progressively scanning said lines, an arm connected to one of said holders to shift the same longitudinally of the lines being photographed so as to effect justification, stop means for limiting movement of said arm in accordance with the justification requirements, electromagnetic means actuating said arm, means to scan said rows of designations, and means actuated by said last means to energize said electromagnetic means when each designation is scanned.

32. A photographic justifying machine comprising a copy-holder to hold a copy to be photographed, a camera including a plate-holder mounted to photograph said copy, scanning means associated with said camera for continuously scanning each line on the copy, means connected to said copy-holder to shift the same longitudinally of the lines of said copy, and means actuating said last means at designated scanning positions for justifying the length of the photographed line.

33. A photographic justifying machine comprising a copy-holder to hold a copy to be photographed, a camera including a plate-holder mounted to photograph said copy, scanning means associated with said camera for continuously scanning each line on the copy, means connected to said plate-holder to shift the same longitudinally of the lines being photographed thereon, and means actuating said last means at predetermined scanning positions to thereby justify the length of the photographed line.

34. A photographic justifying machine comprising a copy-holder to hold a copy to be photographed, a camera including a plate-holder mounted to photograph said copy, scanning means associated with said camera, means to continuously feed said scanning means along each line of the copy for scanning purposes, and means to simultaneously adjust the spacing between characters or groups of characters of said line during the continuous scanning of said line to thereby justify the photographed image.

35. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, means interconnecting said carriage and scanning means to continuously feed said scanning means along the individual lines for scanning purposes, means to synchronize the relative movement of the carrier and the scanning means in accordance with the focus of the camera, and justifying means for relatively shifting said holders after the scanning of each word or group of words and simultaneously with the continuous scanning of said line to thereby justify the photographed image.

36. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, means interconnecting said carriage and scanning means to continuously feed said scanning means along the individual lines for scanning purposes, a change speed mechanism associated with said carriage to permit adjustment and control of the relative movement between said scanning means and said carriage, and justifying means for relatively shifting said holders after the scanning of each word or group of words and simultaneously with the continuous scanning of said line to thereby justify the photographed image.

37. A photographic justifying machine comprising a copy-holder to hold a copy to be photographed, a camera including a plate-holder mounted to photograph said copy, scanning means associated with said plate-holder, means to shift said scanning means transversely between lines, a carriage, means feeding said carriage, means interconnecting said carriage and scanning means to continuously feed said scanning means along the individual lines for scanning purposes, said interconnecting means including an adjustable change speed mechanism to permit relative adjustment of the movements thereof, and justifying means for relatively shifting said holders after the scanning of each word or group of words and simultaneously with the continuous scanning of said line to thereby justify the photographed image.

38. A photographic justifying machine for photographing in justified form a copy comprising a plurality of lines of characters arranged in groups which are separated by spaces, said copy having a row of designations below each line with one of said designations registering with each of said spaces, said machine comprising a a copy-holder to hold said copy, a camera including a plate-holder mounted to photograph said copy, means associated with said plate-holder to scan said lines and said rows of designations, a carriage, means feeding said carriage, means interconnecting said carriage and said scanning means to continuously feed said scanning means along the individual lines and rows of designations, means to sychronize the relative movement of the carrier and scanning means in accordance with the focus of the camera, and means actuated by the scanning of each of said designations for causing a relative shifting between said holders adapted to adjust the spacing between the groups of characters so as to justify the photographed image.

39. A photographic justifying machine for photographing in justified form a copy comprising a plurality of lines of characters arranged in groups which are separated by spaces, said copy having a row of designations below each line with one of said designations registering with each of said spaces, said machine comprising a copy-holder to hold said copy, a camera including a plate-holder mounted to photograph said copy, means associated with said plate-holder to scan said lines and said rows of designations, a carriage, means feeding said carriage, means interconnecting said carriage and said scanning means to continuously feed said scanning means along the individual lines and rows of designations, a change speed mechanism associated with said carriage to synchronize the relative movement of the carrier and scanning means in accordance with the focus of the camera, and means actuated by the scanning of each of said designations for causing a relative shifting between said holders adapted to adjust the spacing between the groups of characters so as to justify the photographed image.

40. A photographic justifying machine for photographing in justified form a copy comprising a plurality of lines of characters arranged in groups which are separated by spaces, said copy having a row of designations below each line with one of said designations registering with each of said spaces, said machine comprising a copy-holder to hold said copy, a camera including a plate-holder mounted to photograph said copy, means associated with said plate-holder to scan said lines, means movable with said line-scanning means for scanning the rows of designations, a carriage, means feeding said carriage, means interconnecting said carriage and each of said scanning means to continuously feed said scanning means along the individual lines and rows of designations respectively, means to synchronize the relative movement of the carrier and line-scanning means in accordance with the focus of the camera, and means actuated by the scanning of each of said designations for causing a relative shifting between said holders adapted to adjust the spacing between the groups of characters so as to justify the photographed image.

41. A photographic justifying machine for photographing in justified form a copy comprising a plurality of lines of characters arranged in groups which are separated by spaces, said copy having a row of designations below each line with one of said designations registering with each of said spaces, said machine comprising a copy-holder to hold said copy, a camera including a plate-holder mounted to photograph said copy, means associated with said plate-holder to scan said lines, means movable with said line-scanning means for scanning the rows of designations, a carriage, means feeding said carriage, means interconnecting said carriage and each of said scanning means to continuously feed said scanning means along the individual lines and rows of designations respectively, a change speed mechanism associated with said carrier to synchronize the relative movement of the carrier and line-scanning means in accordance with the focus of the camera, and means actuated by the scanning of each of said designations for causing a relative shifting between said holders adapted to adjust the spacing between the groups of characters so as to justify the photographed image.

42. A photographic justifying machine for photographing in justified form a copy comprising a plurality of lines of characters arranged in groups which are separated by spaces, said copy having a row of designations below each line with one of said designations registering with each of said spaces, said machine comprising a copy-holder to hold said copy, a camera including a plate-holder mounted to photograph said copy, means associated with said plate-holder to scan said lines, a photo-electric means movable with said line-scanning means for scanning the rows of designations, a carriage, means feeding said carriage, means interconnecting said carriage and each of said scanning means to continuously feed said scanning means along the individual lines and rows of designations, means to synchronize the relative movement of the carrier and line-scanning means in accordance with the focus of the camera, and means actuated in response to the scanning of each of said designations for causing a relative shifting between said holders adapted to adjust the spacing between the groups of characters so as to justify the photographed image.

43. A photographic justifying machine for photographing in justified form a copy comprising a plurality of lines of characters arranged in groups which are separated by spaces, said copy having a row of designations below each line with one of said designations registering with each of said spaces, said machine comprising a copy-holder to hold said copy, a camera including a plate-holder mounted to photograph said copy, means associated with said plate holder to scan said lines, a photo-electric means movable with said line-scanning means for scanning the rows of designations, a carriage, means feeding said carriage, means interconnecting said carriage and each of said scanning means to continuously feed said scanning means along the individual lines and rows of designations, a change speed mechanism associated with said carrier to synchronize the relative movement of the carrier and line-scanning means in accordance with the focus of the camera, and means actuated in response to the scanning of each of said designations for causing a relative shifting between said holders adapted to adjust the spacing between the groups of characters so as to justify the photographed image.

ASHLEY G. OGDEN.